No. 849,108. PATENTED APR. 2, 1907.
J. DREES.
ICE SCRAPER.
APPLICATION FILED OCT. 15, 1906.

Witnesses
C. M. Fahnestock
George Broemmer

Inventor
John Drees
by Alfred M Allen
Attorney

UNITED STATES PATENT OFFICE.

JOHN DREES, OF COVINGTON, KENTUCKY.

ICE-SCRAPER.

No. 849,108.     Specification of Letters Patent.     Patented April 2, 1907.

Application filed October 15, 1906. Serial No. 339,008.

*To all whom it may concern:*

Be it known that I, JOHN DREES, a citizen of the United States, residing in Covington, county of Kenton, and State of Kentucky, have invented certain new and useful Improvements in Ice-Scrapers, of which the following is a full, clear, and exact description, reference being had to the accompanying drawings, forming part of this specification.

My improvements relate to devices for scraping ice into fine flakes for the formation of ice-balls and powdered ice for various purposes as used by confectioners, ice-cream dealers, and the like, and the purpose of my invention is to provide an ice-scraper to which the glass or other receptacle for the powdered ice may be conveniently attached, so that the flakes of ice scraped from the cake may be deposited directly into the receptacle and the receptacle then removed from the scraper without the loss of any of the powdered ice or the necessity of crowding the mass of material into the receptacle after it has been powdered by the scraper.

Figure 1:
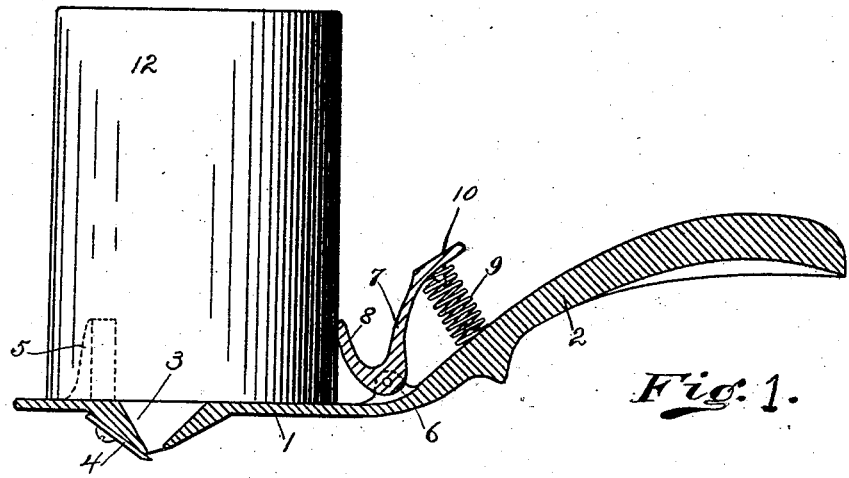
Figure 2:
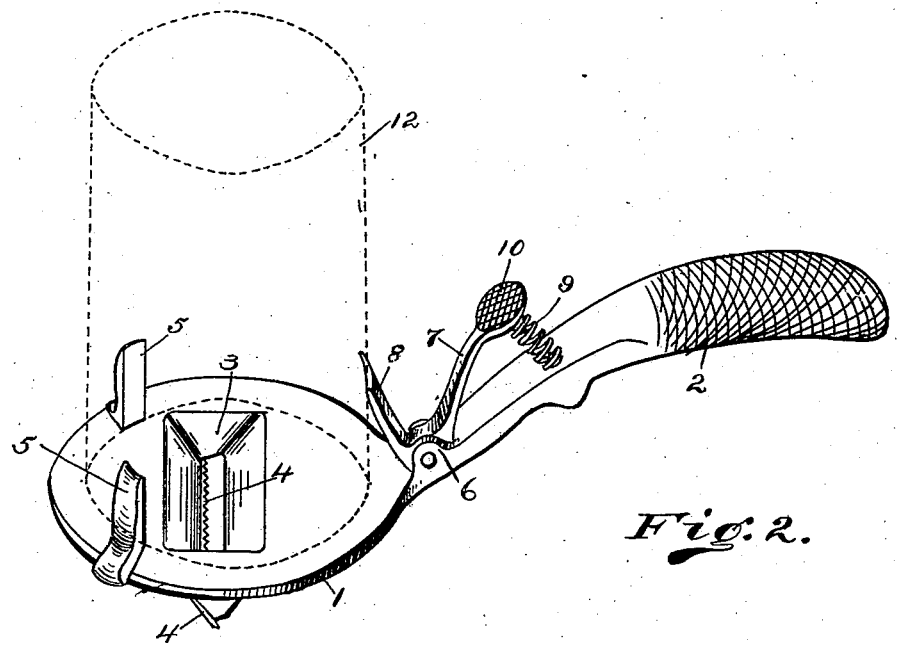

In the drawings, Figure 1 is a perspective view of my improved device. Fig. 2 is a central vertical section of same.

1 is a metal circular plate with a handle 2, preferably cast in a single piece. The plate is provided with a slotted recess 3 with a knife or scraper blade 4, preferably serrated, secured along the base of the slotted portion, so that by drawing the tool over a cake of ice flakes will be scraped therefrom and forced through the slot 3 upward.

5 5 are a pair of lugs projecting upward near the periphery of the disk, and these lugs may be cast integral with the plate 1 or secured thereon in any desired way.

Pivoted on the lug 6 at the base of the handle is the lever 7, provided with a broad clasping-face 8, and the outer end of the lever is pressed upward by the spring 9, interposed between the head 10 of the lever and the handle.

Any desired glass 12 or other receptacle is placed upside down on the plate 1, the lever 7 being depressed to allow for the insertion of the glass, and the lever being released the glass is held firmly on the device between the lugs 5 5 and the holding-face 8 of the lever. The powdered ice, therefore, is forced directly into the glass or other receptacle without the necessity of first powdering the ice and then transferring it to the glass.

Having thus described my invention, what I claim as new; and desire to secure by Letters Patent, is—

An ice-scraping tool, comprising a circular base-plate, provided with a handle, a central elongated opening through the plate, with scraping-knife secured along the edge of the opening, with retaining-lugs projecting upward from the plate, a pivoted lever with clasping-face, and a spring bearing thereon, to hold a glass or other receptacle on the base-plate.

JOHN DREES.

Witnesses:
    WM. C. PEIRCE,
    GLENA PRITCHARD.